(12) United States Patent
Riedel et al.

(10) Patent No.: US 11,503,385 B2
(45) Date of Patent: *Nov. 15, 2022

(54) LIVE BROADCAST IP LATENCY COMPENSATION

(71) Applicant: VIACOM INTERNATIONAL INC., New York, NY (US)

(72) Inventors: Gregg William Riedel, New York, NY (US); Jonathan Edlin Clegg, New York, NY (US); Jeff Hess, New York, NY (US); Justin Keene Dorsa, New York, NY (US)

(73) Assignee: VIACOM INTERNATIONAL INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,717

(22) Filed: Oct. 21, 2021

(65) Prior Publication Data

US 2022/0046335 A1 Feb. 10, 2022

Related U.S. Application Data

(63) Continuation of application No. 16/421,681, filed on May 24, 2019, now Pat. No. 11,184,684.

(51) Int. Cl.
*H04N 21/8547* (2011.01)
*H04N 21/2187* (2011.01)
*H04N 21/45* (2011.01)

(52) U.S. Cl.
CPC ..... *H04N 21/8547* (2013.01); *H04N 21/2187* (2013.01); *H04N 21/4532* (2013.01)

(58) Field of Classification Search
CPC ........... H04N 21/8547; H04N 21/2187; H04N 21/4532
See application file for complete search history.

(56) References Cited

U.S. PATENT DOCUMENTS

| | | | |
|---|---|---|---|
| 6,741,614 B1 * | 5/2004 | Porter | H04W 56/003 370/332 |
| 2015/0113576 A1 * | 4/2015 | Carroll | H04N 5/268 725/109 |
| 2018/0278999 A1 * | 9/2018 | David | H04N 21/42203 |

* cited by examiner

*Primary Examiner* — Nnenna N Ekpo
(74) *Attorney, Agent, or Firm* — Fay Kaplun & Marcin, LLP

(57) ABSTRACT

An operations center that performs a method that includes receiving a live content feed of a live event, inserting a time indication in the live content feed to generate a marked feed, the time indication indicative of a receive time that the live content feed is received at the operations center, encoding the marked feed to generate an Internet Protocol (IP) feed, the IP feed being exchanged through the operations center, determining a read time during a skip offset process corresponding to when the time indication is identified in the skip offset process, determining a propagation delay based on the read time and the receive time and generating a broadcast output that transitions, based on the propagation delay, from one of (i) the live event to recorded content or (ii) recorded content to the live event.

20 Claims, 3 Drawing Sheets

LIVE BROADCAST IP LATENCY COMPENSATION

PRIORITY DATA

The present application is a Continuation application of U.S. patent application Ser. No. 16/421,681 filed on May 24, 2019; the entire disclosure of the above application(s)/patent(s) is expressly incorporated herein by reference.

BACKGROUND INFORMATION

A content distribution system may show a live event as a television broadcast to an audience in a variety of different manners. A live event may include live content interspersed with non-live content (e.g., recorded content such as advertisements). In a first example, the content distribution system may generate a television program by internally utilizing uncompressed serial digital interface (SDI) technology as a video transport. In a second example, the content distribution system may generate a television program by internally utilizing compressed or uncompressed video transported over an Internet Protocol (IP) network. Because the progress of the live event is non-deterministic with an exact ending time of a particular segment being unknown, the transitions between the live content and the non-live content require a dynamic and ad hoc approach as instructed by a program director of the live event and executed by an operations staff.

In a conventional SDI broadcast facility, a signal associated with the television broadcast of the live event is received at an operations center (e.g., playout facility broadcasting the live event) and may be converted to SDI to be propagated through the operations center to a playout arrangement. This propagation results in a small and relatively consistent latency between when the live event signal is received at the operations center and when it is transmitted for broadcast. The program director may decide when the end of a segment of the live event is to occur and instruct the operations staff to prepare to switch from the live content to the non-live content. With the small and consistent latency, the operations staff and the operations center may perform the switch at a time indicated by the program director in a relatively seamless manner with little to no break between the live content and the non-live content.

When the content distribution system utilizes IP technology to generate a television broadcast of the live event, the data of the live content may propagate through the operations center before being transmitted for the broadcast. For example, the data may be the audio, visual and ancillary data components of the live content. However, the propagation of the data for the live content including any processing (e.g., formatting, encoding, etc.) introduces a non-negligible amount of latency (e.g., greater than the acceptable threshold for broadcast requirements). Specifically, the operations center may include one or more encoders that encode the data of the live content resulting in a relatively large latency being introduced. Furthermore, the latency may be inconsistent such that a first latency for a first switch may be different from a second latency for a second switch. Therefore, a switch between the live content and the non-live content may result in unacceptable delays or inadvertent cuts in the viewing content of the broadcast. Furthermore, a static propagation delay value may not be relied upon to perform the switches through the segments of the live event.

SUMMARY

In one exemplary embodiment, a method is performed at an operations center. The method includes receiving a live content feed of a live event, inserting a time indication in the live content feed to generate a marked feed, the time indication indicative of a receive time that the live content feed is received at the operations center, encoding the marked feed to generate an Internet Protocol (IP) feed, the IP feed being exchanged through the operations center, determining a read time during a skip offset process corresponding to when the time indication is identified in the skip offset process, determining a propagation delay based on the read time and the receive time and generating a broadcast output that transitions, based on the propagation delay, from one of (i) the live event to recorded content or (ii) recorded content to the live event.

In another exemplary embodiment, an operations center is described. The operations center includes a timestamp inserter configured to insert a time indication in a live content feed of a live event to generate a marked feed, the time indication indicative of a receive time that the live content feed is received at the operations center, an encoder configured to encode the marked feed to generate an Internet Protocol (IP) feed, the IP feed being exchanged through the operations center and a playout arrangement configured to determine a read time during a skip offset process corresponding to when the time indication is identified in the skip offset process, the playout arrangement configured to determine a propagation delay based on the read time and the receive time, the playout arrangement configured to generate a broadcast output that transitions, based on the propagation delay, from one of (i) the live event to recorded content or (ii) recorded content to the live event.

DETAILED DESCRIPTION

Figure 1:
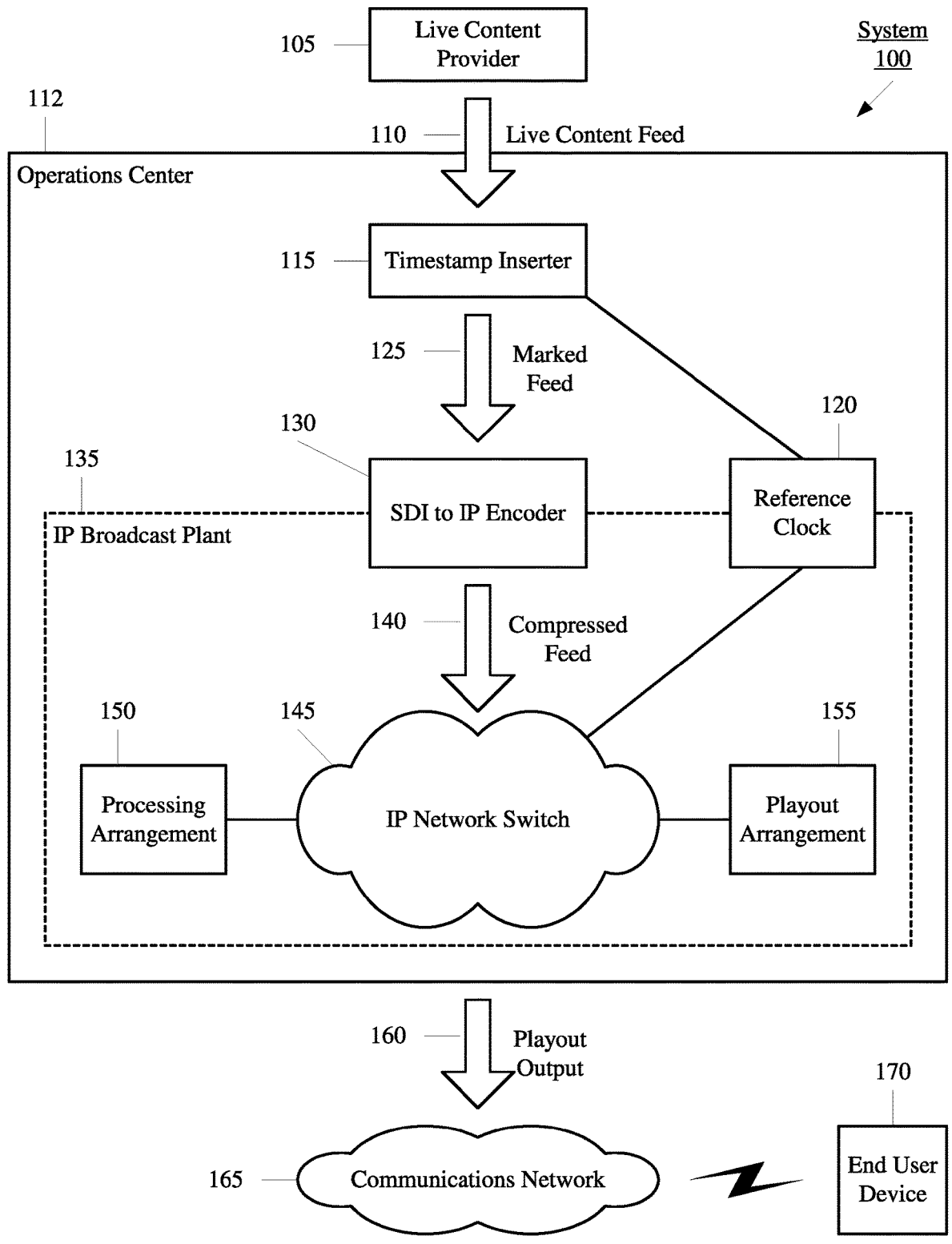
FIG. 1 shows an exemplary system generating a playout output of a live event according to various exemplary embodiments described herein.

The exemplary embodiments may be further understood with reference to the following description and the related appended drawings, wherein like elements are provided with the same reference numerals. The exemplary embodiments are related to a device, system, and method to automatically determine the latency through a live broadcast encoding path for a television program of a live event. A content distribution system may use the value of the latency to tune a propagation delay used to switch from live content to non-live content. The exemplary embodiments provide a mechanism that compensates for the varying degrees of latency caused by propagation of data for the television broadcast of the live event through the content distribution system.

Initially, the exemplary embodiments are described with regard to broadcasting a live event using Internet Protocol (IP) technology internally, and a resulting relatively large and inconsistent latency caused by generating a broadcast utilizing IP technology. However, the use of the IP technology is only exemplary. The exemplary embodiments may also be utilized in other formats or types of streams in which a latency or propagation delay that is large and/or inconsistent is introduced prior to the broadcast, particularly a latency introduced after receiving data of the broadcast and before transmission of the broadcast. Thus, the use of IP technology is for illustrative purposes and the exemplary embodiments may be implemented for other types of broadcast transports.

The exemplary embodiments are also described with regard to the non-live content interspersed between the live content segments as a commercial or advertisement block including one or more commercials or advertisements. However, the television broadcast may include any type of non-live content that may be introduced between segments of the live content. Thus, the use of the advertisements is for illustrative purposes and may represent any type of non-live content. The content interspersed between the live content segments being non-live is also only for illustrative purposes. For example, a commercial may be broadcast live and placed between live content segments. Thus, the use of non-live content may represent any content that may be placed between the live content segments. As used herein, the non-live content, the commercial, and the advertisement may be used interchangeably with particular use of the commercial in view of the relation to a television broadcast. The broadcast being a television broadcast is also only illustrative. The exemplary embodiments may be utilized with any type of live broadcast through various media formats.

To broadcast a live event, a content distribution system may receive a live content feed including live content and intersperse prepared commercials between segments of the live content. Thus, at the end of each segment of the live content, the content distribution system may insert the commercials. At the end of a block including one or more commercials, the content distribution system may revert to the live content by starting the next live content segment. An objective in performing this operation is to perform the switch between the live content and the commercials from the perspective of the audience viewing the television broadcast without any breaks or with a break that is below an acceptable threshold duration.

In an exemplary manner of broadcasting the live event, the content distribution system may generally be in an "upcounting" mode where the live content continues to air until manual intervention transitions from the live event to recorded content (e.g., a commercial). Again, a segment of a live event may not end at a precise scheduled time. Therefore, manual interventions are used to coincide with the dynamic ends of the live content segments. The manual intervention indicates that the television broadcast is to skip into the next scheduled content (e.g., the commercial). The content distribution system may adopt this upcounting mode with manual interventions and be configured to utilize a conventional serial digital interface (SDI) approach and/or an IP approach in propagating the television program internally through the operations center. The exemplary embodiments are directed to when the content distribution system switches from the live content to the commercials using the IP approach. However, those skilled in the art will understand that the exemplary embodiments may also be utilized and/or modified for when the content distribution system switches from the commercials back to the live content (e.g., to notify the venue at which the live event is occurring of the time that broadcasting live will resume).

In the conventional SDI approach, a signal corresponding to the live content of the live event is received at an operations center of the content distribution system. As the signal propagates through the operations center for processing, the live content is played out with a latency due to a propagation delay. However, the latency is relatively small and relatively consistent throughout the television broadcast of the live event such that there is little to no impact on switching from the live content to the commercials.

In an exemplary manner of switching from the live content to the commercials using the SDI approach, a program director at the venue may signal the staff at the operations center about when the current live content segment will conclude so that the television broadcast is to cut to commercial. A conventional approach is for the program director to provide a verbal countdown to the commercial. Thus, when the program director has counted down to "0", at "0" and using a manual intervention, the staff may enter a manual input that cuts the live content and switches to the commercials. There may be various standards that require that a preroll be used. For example, the content distribution system may require that a 2 second preroll be used for broadcasting live events. Thus, when the program director has counted down to "2", at "2", the staff may enter the manual input to trigger the 2 second preroll. When the preroll has concluded, the content distribution system may switch from the live content to the commercials. In switching from the commercials to the live content, with known durations for each commercial being played, the staff may know precisely when the next live content segment is to start. Thus, an opposite direction for indications may be used where the staff instructs the program director about when the live content is to start again for the television broadcast. In this manner, the program director may inform the live event staff or participants when the live event continues (e.g., with the next live content segment). In one exemplary embodiment implementing the present invention, the return to the live broadcast may happen as a verbal or other type of countdown using a countdown graphical user interface (GUI} informed by the determined propagation delay value and the known start time of the next live event block (e.g., once a commercial block has started, its length is deterministic and therefore the start time of the next live block is also known).

With the latency for the SDI approach being minimal and consistent, the content distribution system may use the manual intervention and the preroll for the overall television broadcast to be viewed seamlessly with little to no dead airtime. However, when moving to the IP approach, the data of the live content being received and propagated through an IP broadcast plant of the operations center generates a much larger latency that may also be variable. There may be various reasons for the increased latency and the variable latency. For example, in generating the IP stream of the live content, the encoding settings on the SDI to IP encoder may be changed, multiple encoders with different encoding times may be used, the software version on the SDI to IP encoder may be changed, an upgrade to components (e.g., hardware, software, and/or firmware) of the content distribution system may result in changes to the IP transport stream input feature, the networking hardware or path may change, etc.

In an exemplary manner of switching from the live content to the commercials using the IP approach, a substantially similar process may be adopted in utilizing IP technology internally for the television broadcast. For example, there may be a countdown and a manual intervention may be provided to perform the switch. A preroll may also be incorporated. However, in the IP approach, the operations staff must compensate for the latency which is non-negligible. Using a similar manual intervention as the SDI approach, when the program director counts down to "0" (assuming no preroll requirement), the operations staff would then wait for the latency amount. For example, the latency in the IP approach may be 13 seconds. The operator in the operations staff would wait for the program director to count down to "0", then wait another 13 seconds to enter the manual input to perform the switch. If the manual input is entered when the program director has counted down to "0" without waiting for the latency duration, the final 13 seconds of the current live content segment would be cut, and commercials would begin rolling. Even if a clock or timer were to be used in the subsequent waiting period corresponding to the latency to eliminate human error, the latency associated with the IP approach may still cause the output IP stream to encounter timing issues. There is also enough of a potential for the latency to change occasionally to impact broadcasting live events in an IP stream.

In an exemplary implementation of a playout for the television broadcast utilizing the IP transport approach, the live content feed may be received and encoded to be propagated and played out utilizing an IP stream. Again, the encoding may introduce latency in the IP stream. When the switch is performed, the manual input to begin rolling out commercials occurs in a substantially instantaneous manner. Thus, in an exemplary scenario, when the program director counts down to "0" and a user enters the manual input at this time to roll commercials, the television broadcast may begin playing out commercials and will cut the ending of the live content segment for a duration corresponding to the latency amount. In another manner, after the program director has counted down to "0", the user may wait for the latency amount and enter the manual input but wait too long. In such a scenario, the television broadcast may conclude the live content segment, have dead airtime or air unwanted content (e.g., if the live venue is not aware it is still being aired) for the duration beyond the latency, and then roll commercials. In either scenario, the broadcast of the television program using the IP approach requires precise timing to perform the switch from the live content to the commercials.

The exemplary embodiments are directed to receiving a live content feed for a television broadcast of a live event and generating the television broadcast utilizing IP technology. The exemplary embodiments provide an automated manner of performing the switch from live content to commercials that compensates for the propagation delay associated with the IP approach. The exemplary embodiments further dynamically adjust to the varying propagation delay by automatically determining the propagation delay and performing appropriate programming to the switch operation to compensate for the determined propagation delay. As will be described in detail below, the manual intervention mechanism associated with the SDI approach may be used in a substantially similar manner and the exemplary embodiments may be configured to perform the subsequent operations in view of the propagation delay of the IP approach. The exemplary embodiments provide a delayed skip that automatically waits the duration of the propagation delay, a mechanism to programmatically measure the propagation delay, and a mechanism to configure the content distribution system to incorporate the delayed skip for the determined propagation delay.

The exemplary embodiments are described as a fully automatic operation once the manual intervention has been input. Thus, for each instance that the switch from the live content to the commercials is to be performed, upon receiving the manual intervention, the exemplary embodiments are configured to perform all remaining operations for the switch in a seamless manner with little to no dead airtime as well as playing out content as intended. However, the exemplary embodiments may also utilize further manual inputs after the manual intervention indicating that the switch is to be performed. For example, a user of the operations facility may confirm or override the propagation delay as needed. The exemplary embodiments are also described as using a single calculated propagation delay value when the switch is to be performed. However, this type of calculated propagation delay value is only exemplary. The exemplary embodiments may utilize a moving average sampled over time or over a set of frames.

FIG. 1 shows an exemplary system 100 generating a playout output 160 of a live event according to various exemplary embodiments described herein. For example, the system 100 may include various components of a content distribution system configured to output the playout output 160 to user devices configured to receive and display the television broadcast. The system 100 may be implemented in various broadcast systems that generate the playout output 160. The system 100 may include a live content provider 105, an operations center 112 including a timestamp inserter 115, a reference clock 120, an encoder 130, and an IP broadcast plant 135. The system 100 may also include a communications network 165 and an end user device 170. The system 100 may also include various feeds, inputs, and/or outputs. As illustrated, the system 100 may also include a live content feed 110, a marked feed 125, a compressed feed 140, and the playout output 160.

The system 100 may incorporate further components of a broadcast system in a hardware, software, and/or firmware capacity. For example, the system 100 may further include at least one of origination services, a personalization server using advertisements provided by an advertisement server, graphics provided by a graphics server, etc., a distribution cache, a content delivery network, etc. The system 100 may include functionalities that reside in one or more of the components described above or these further components noted in an individual or distributed manner.

The live content provider 105 may be an entity that is capturing a live event to generate the live content feed 110. The live event (e.g., concert, sporting event, awards show, etc.) may be held at a venue and the live content provider 105 may include one or more capturing devices (e.g., camera, microphone, etc.) that capture the live event and generate corresponding raw data. The raw data may be converted into the live content feed 110. The live content provider 105 may have components that are located at the venue (e.g., the sensory capturing devices) and/or remote locations (e.g., data processing devices) that capture, receive, and process the raw data to generate the live content feed 110. The live content feed 110 may be provided in any format. For example, the live content feed 110 may be in an SDI format from fiber, satellite, etc. In another example, the live content feed 110 may be a different inbound transport type such as a moderately compressed JPEG2000. For illustrative purposes, the exemplary embodiments are described with the live content feed 110 being received in the SDI format where the live content provider 105 provides an output in the SDI format or a conversion is performed to generate the output in the SDI format.

The operations center 112 may be a location where the live content feed 110 is processed and the playout output 160 is generated. The operations center 112 may be a physical location that is on site (e.g., at the venue) or remote. The operations center 112 may also be a virtualized implementation that processes the live content feed 110 and generates the playout output 160. The operations center 112 may be configured to utilize a standard SDI approach in generating the playout output 160 or may also utilize the IP approach in which IP technology is used in generating the playout output. As the exemplary embodiments are directed to the IP transport, the description below is directed to components and operations performed at the operations center 112 related to the IP approach.

The timestamp inserter 115 may be a component of the operations center 112 that initially receives the live content feed 110 and performs a first operation according to the exemplary embodiments. As will be described in further detail below, the operation performed by timestamp inserter 115 includes inserting an indicator corresponding to a time of the receipt of the live content feed 110 and/or individualized components thereof (e.g., a frame) at the operations center 112. The timestamp inserter 115 may output the marked feed 125. The timestamp inserter 115 may also add or overwrite an inbound timestamp with a current facility time corresponding to a time of signal receipt based on the reference clock 120. With the live content feed 110 being in the SDI format, the marked feed 125 may also be in the SDI format. As will be described below, the timestamp inserter 115 may perform the first operation in a number of different manners. As will also be described below, based on the indicator, after encoding of the live content feed 110 or a modified version, a propagation delay may be determined to configure the IP transport stream with a properly timed switch from the live content to the commercials so that the playout output 160 is generated in an intended manner.

The reference clock 120 may be any source from which a time is reliably provided to the timestamp inserter 115 and subsequently used at the IP broadcast plant 135. As illustrated, the reference clock 120 may be a component of the operations center 112. However, this arrangement is only illustrative and those skilled in the art will understand mechanisms by which components may be synchronized to the reference clock 120 that may be local or remote. As noted above, the IP approach may encounter timing issues due to the propagation delay caused from encoding the live content feed 110 (e.g., compression). The reference clock 120 may provide a first time used by the timestamp inserter 115 in creating the indicator to be inserted in the live content feed 110. The reference clock 120 may further provide a second time used by the IP broadcast plant 135 to determine a skip offset or propagation delay that was introduced from the compression encoding of the content feed. In this manner, the reference clock 120 may be dual-homed in both SDI (e.g., for the live content feed 110) and IP (e.g., for a resulting IP transport stream used in the IP broadcast plant 135). To ensure that a common basis is used for comparison purposes, the timestamp inserter 115 and the IP broadcast plant 135 may be slaved to a single master clock such as the reference clock 120. The reference clock 120 may be any type of reliable timing device such as a GPS clock, a highly reliable backup clock, etc. upon which a sanitized timestamp is relied.

The timestamp inserter 115 may determine a receive time by reading the reference clock 120 at a time that the live content feed 110 is received. As described above, the timestamp inserter 115 may insert a time indication corresponding to the read time into the live content feed 110 to generate the marked feed 125. The time indication may be a timestamp or a timecode that is inserted within the live content feed 110. Those skilled in the art will understand that a timecode is frame rate dependent, while a timestamp is independent of the frame rate. Throughout this description, it is described that a timestamp is used in the exemplary embodiments. Because a timestamp is frame rate independent, the timestamp may be used with any format of the playout content. However, one of ordinary skill in the art will understand the modifications to use a timecode instead of a timestamp in the exemplary embodiments. Thus, the term "timestamp" as used herein may also refer to a timecode. Accordingly, the time indication may provide a basis from which the playout arrangement 155 subsequently determines any resulting propagation delay or latency for which a skip offset is to be applied.

The timestamp inserter 115 may insert the time indication in a number of manners. In a first example, the timestamp inserter 115 may insert the timestamp to frames of the live content feed 110. For example, the timestamp inserter 115 may insert the timestamp to each frame, to every other frame, etc. of the live content feed 110. In a second example, the timestamp inserter 115 may insert the timestamp to a created output inserted into the live content feed 110. The timestamp inserter 115 may be configured to create the output such as a monotone frame (e.g., black) on which the timestamp is inserted. The timestamp may further be burned in the live content feed 110.

The timestamp inserter 115 may insert the time indication based on a type of encoding of the live content feed 110 and/or an expected encoding to be used in the encoded feed 155. For example, the timestamp inserter 115 may insert the time indication based on an SDI format that the live content feed 110 is received. The timestamp inserter 115 may include an initial operation to determine whether a given output has time indications embedded in metadata. Although select encoding types may automatically place a time indication in an appropriate place within the data (e.g., based on the output codec), certain encoding types or codecs may insert the time indication in a video I-frame metadata while others may insert the time indication in supplemental enhancement information (SEI) picture timing messages. In other exemplary embodiments, the timestamp may be embedded into the transport stream packetized elementary stream (TS PES) or may be inserted using steganography. The timestamp inserter 115 may be configured to accommodate any encoding type. When the timestamp inserter 115 burns the time indication, the timestamp inserter 115 may determine whether a given output has visible time indications inscribed into the video frames themselves. As those skilled in the art will understand, the time indications may not be an overlay but rather a permanent part of the video frames. In this manner, the timestamp inserter 115 may generate the marked feed 125 by inserting the receive time as provided by the reference clock 120 into the live content feed 110.

The encoder 130 may receive the marked feed 125 which is a modified version of the live content feed 110 in which indicators have been inserted. The encoder 130 may encode the marked feed 125 to generate the compressed feed 140. For example, the encoder 130 may encode the marked feed 125 to an IP transport stream using IP technology. The encoder 130 may encode the marked feed 125 using any type of encoding operation so long as it preserves the time signal. For example, the encoder 130 may generate the compressed IP transport stream feed 140 as H.264 in a MPEG-2 transport stream at 25 Mbps. With the encoder 130 converting SDI to IP, the encoder may be dual-homed in both SDI and IP in a manner substantially similar to the reference clock 120.

The IP broadcast plant 135 may be a portion of the operations center 112 encompassing a portion of the operations center 112 directed to using IP technology. Accordingly, the IP broadcast plant 135 may be where the compressed feed 140 is exchanged. For example, the IP broadcast plant 135 may be a representation of the operations center 112 where audiovisual and/or ancillary data is moved around the operations center 112 as the compressed feed 140. Accordingly, the reference clock 120 and the encoder 130 are illustrated in their dual-home arrangement within the operations center 112 relative to the IP broadcast plant 135 as partially incorporated in the IP broadcast plant 135 and partially incorporated in an SDI portion of the operations center 112 (e.g., outside the IP broadcast plant 135). For illustrative purposes, the compressed feed 140 may remain entirely within the IP broadcast plant. For example, the compressed feed 140 may be converted back to the SDI format for delivery in the playout output 160. Thus, the compressed feed 140 may remain entirely in the IP broadcast plant 135. The IP broadcast plant 135 may include an IP network switch 145, a processing arrangement 150, and a playout arrangement 155.

The exchange of data in the IP broadcast plant 135 may include the exchange of the compressed feed 140 but may also entail an exchange of other data such as the marked feed 125 in the SDI format, an uncompressed feed using IP technology (e.g., as an uncompressed IP stream such as SMPTE 2022-6), etc. For example, components of the IP broadcast plant 135 may exchange the marked feed 125 in the SDI format or the uncompressed IP feed with minimal latency (e.g., a latency of a few frames where one frame is approximately 33 ms in North America (e.g., NTSC) or 40 ms in Europe (e.g., PAL)). The IP broadcast plant 135 may exchange the data corresponding to the live content of the live event in the SDI format or the uncompressed IP stream when there is available bandwidth for such an exchange. As the SDI format and the uncompressed IP stream may be encoded at 1,500 Mbps (e.g., about 60 times the bandwidth used by the compressed feed 140), the IP broadcast plant 135 may determine whether the exchange in the compressed feed 140 may be used or preferable. For example, when the operations center 112 processes a plurality of streams (e.g., over 500 streams), an aggregate bandwidth resulting from using the SDI format or the uncompressed IP stream may be untenable (e.g., requiring 750 Gbps of aggregate bandwidth). Therefore, using the compressed format 140 may be preferable where the plurality of streams require a fraction of the bandwidth as the SDI format or the uncompressed IP stream (e.g., 12.5 Gbps which fits in a single 40 Gbps IP network switch 145 used in the IP broadcast plant 135). For illustrative purposes, the exemplary embodiments are described with regard to the IP broadcast plant 135 exchanging data as the compressed feed 140. However, the exemplary embodiments may also exchange data in the SDI format or as the uncompressed IP stream when resources are available to avoid any latency that may be introduced from the encoding.

The IP network switch 145 may be a communicative component of the IP broadcast plant 135 configured to exchange data between components of the IP broadcast plant 135. For example, the compressed feed 140 from the encoder 130 may be exchanged between the processing arrangement 150 and the playout arrangement 155. The IP network switch 145 being a switch is only illustrative and may represent any component configured to provide a communication pathway to exchange data between the components. In a particular implementation, as described above, the IP network switch 145 may support up to a 40 Gbps bandwidth for one or more data exchanges being performed.

The processing arrangement 150 may be one or more components of the IP broadcast plant 135 configured to perform respective operations that may be incorporated by the playout arrangement in generating the playout output 160. For example, the processing arrangement 150 may include a signal processor, a delay station, a live captioning unit, etc. Thus, the audiovisual and ancillary data of the compressed feed 140 may be processed accordingly by the processing arrangement 150 with regard to the respective operations.

The playout arrangement 155 may be a component of the IP broadcast plant 135 directed to generating the playout output 160. For example, the playout arrangement 155 may be configured to utilize IP technology and the compressed feed 140 along with time information from the reference clock 120 to perform a switch from live content to commercials when a manual or automatic intervention is received. The playout arrangement 155 may subscribe to the compressed feed 140 via the IP network switch 145. In another exemplary embodiment, the playout arrangement 155 may directly receive the compressed feed 140 when there is no network switch. As will be described in further detail below, the playout arrangement 155 may then format the program for broadcast, play down pre-recorded content such as commercials, promos, bumpers, etc., and output a final audiovisual and ancillary data program as the playout output 160 for delivery to the end user device 170 via the communications network 165. According to the exemplary embodiments, the playout arrangement 155 may further determine a latency resulting from the marked feed 125 being encoded into the compressed feed 140 and incorporate a corresponding skip offset when transitioning from the live content to the commercials.

Figure 2:
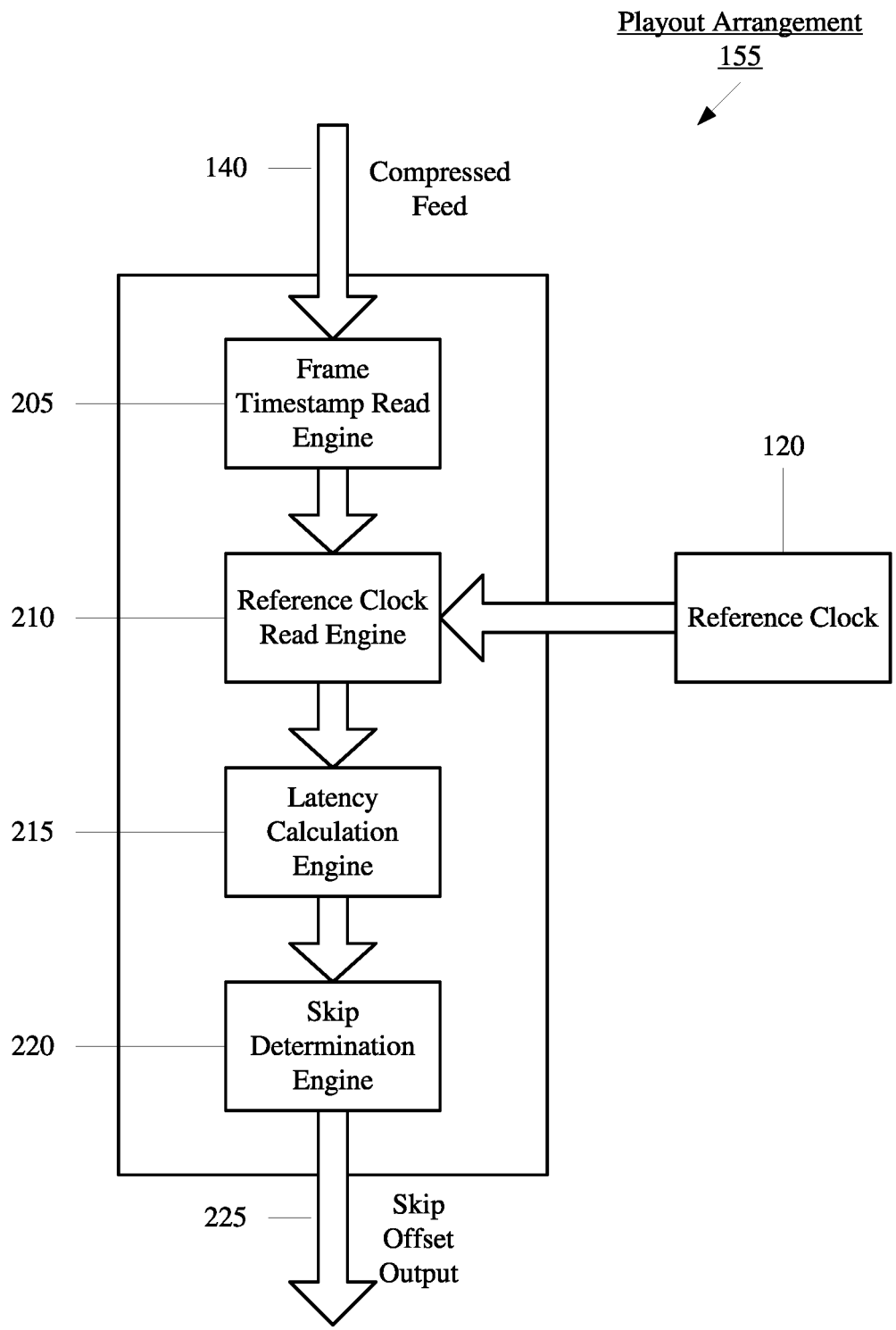
FIG. 2 shows an exemplary playout arrangement of the system FIG. 1 according to various exemplary embodiments described herein.

In an exemplary operation, the playout arrangement 155 is configured to determine a skip offset that is to be used when switching from live content to commercials that corresponds to a latency or propagation delay when the marked feed 125 is encoded into the compressed feed 140. FIG. 2 shows the playout arrangement 155 of the system 100 of FIG. 1 according to various exemplary embodiments described herein. FIG. 2 illustrates an exemplary manner in which the skip offset is determined. The playout arrangement 155 is configured to execute a plurality of engines to perform a switch from the live content to the commercials when a live content segment has concluded. As described above, when the television broadcast uses the IP approach, there may be a propagation delay when the live content feed 110 is processed and propagated through the operations center 112 before being broadcast as the playout output 160. The playout arrangement 155 may compensate for the propagation delay in an automated manner so that the switch from the live content to the commercials is performed without dead air or cut content.

The playout arrangement 155 may be embodied in a variety of different manners. In a first example, the playout arrangement 155 may be embodied as a network component (e.g., a server) of the IP broadcast plant 135. Accordingly, the exemplary embodiments may implement the playout arrangement 155 in physical components. According to this implementation, the playout arrangement 155 may include hardware, software, discrete components such as an application specific integrated circuit (ASIC) or a system on chip (SoC), FPGA chipset, a processor, a memory arrangement, a transceiver, and/or firmware components such as a gateway, engine, etc. In further forms of this implementation, the playout arrangement 155 may be implemented as hardware alone, as software alone, as firmware alone, or as a combination of two or more of hardware, software, and firmware. In a second example, the operations of the playout arrangement 155 may be represented as a separate incorporated component or a modular component coupled to a component of the playout arrangement 155, e.g., an integrated circuit with or without firmware. The operations may also be embodied as one application or separate applications or as part of one or more multifunctional programs. In a third example, the playout arrangement 155 may be embodied in a cloud or virtual machine environment that may not rely on any particular hardware component. Accordingly, the playout arrangement 155 may be implemented in the cloud or in a virtual machine environment that is configured to generate the playout output 160. When implemented in a cloud or with virtual machines, the functionalities and operations performed by the playout arrangement 155 may be instructions that may cause other components or other devices to perform corresponding operations.

In determining a skip offset to be applied, the playout arrangement 155 compensates for a propagation delay that is introduced from an encoding process that creates the compressed feed 140. To create the playout output 160 in a seamless manner with content playing out as intended, the exemplary embodiments determine the propagation delay at the time the switch from the live content to the commercials is to occur and offsets the propagation delay with a corresponding skip offset. In preparation for the propagation delay, the timestamp inserter 115 inserts the time indication to the live content feed 110 such that the marked feed 125 provides a time that a frame or generated output in the live content feed 110 is received by the operations center 112.

As described above, the timestamp inserter 115 and the playout arrangement 155 may be slaved to the reference clock 120. The operations center 112 may include further features to ensure that these components are indeed running off the reference clock 120 in the same way. For example, an asynchronous autonomous workflow may be instantiated to ensure the synchronization between the timestamp inserter 115 and the playout arrangement 155 based on the reference clock 120. In another example, the timestamp inserter 115 and the playout arrangement 155 may confirm a network time protocol (NTP) drift from the reference clock 120. If the timestamp inserter 115 and the playout arrangement 155 become unsynchronized, the operations center 112 may be configured to automatically correct the issue. The operations center 112 may perform this confirmation at various times (e.g., continuously, at predetermined intervals, when an event occurs, etc.). An administrator (e.g., the staff at the operations center) may also be alerted (e.g., SNMP trap, e-mail notification, visual alert or notification in a software interface (Graphical User Interface), etc.) for a manual fix to be applied. Accordingly, the playout arrangement 155 may perform the skip offset process based on the synchronization to the reference clock 120 that the timestamp inserter 115 is also slaved.

Returning to FIG. 2, in performing the skip offset process, the playout arrangement 155 may utilize a plurality of engines that perform respective operations. For example, the playout arrangement 155 may include a frame timestamp read engine 205, a reference clock read engine 210, a latency calculation engine 215, and a skip determination engine 220. The playout arrangement 155 may receive the compressed feed 140 which, as described above, is an encoded version of the marked feed 125. The playout arrangement 155 may output a skip offset output 225. The playout arrangement 155 may use the skip offset output 225 to determine a skip offset to be applied when transitioning from the live content to the commercials at the end of a live content segment.

When the playout arrangement 155 receives the compressed feed 140, the frame timestamp read engine 205 may determine a receive time in the compressed feed 140. As described above, the timestamp inserter 115 may have inserted a time indication as a receive time at the time a frame or a generated output included in the live content feed 110 is received. The frame timestamp read engine 205 may identify this receive time which corresponds to when the frame/output was received. The reference clock read engine 210 may determine a read time of the reference clock 120. The read time may correspond to a current time that the skip offset process is being performed. The current time may reflect when the compressed feed 140 has been received by the playout arrangement 155 (e.g., after the latency from the encoding operation by the encoder 130 and any other processing/propagation of the marked feed 125 such as from a networking gear, other processing gear, speed of light, etc. has been introduced).

In an example of the above process, the marked feed 125 may have a time indication indicating the live content feed 110 was received in a frame N. For example, the time indication may be in a HH:MM:SS.frames notation (e.g., 20:00:00.00 which indicates a first frame at 8:00 pm). The frame timestamp read engine 205 may therefore determine this receive time when the compressed feed 140 is received by the playout arrangement 155. When the marked feed 125 is encoded by the encoder 130, the latency or propagation delay may be introduced. For example, the encoding and/or other processing operations may result in exactly a 13 second latency. When a corresponding frame N in the compressed feed 140 is received by the playout arrangement 155, the reference clock 120 may provide a time corresponding to the 13 second latency. Thus, the reference clock 120 may have a time of 20:00:13.00. The reference clock read engine 210 may identify this read time.

The latency calculation engine 215 may determine the latency that was introduced from propagating the live content feed 110 through the operations center 112. For the frame N, the latency calculation engine 215 has the receive time that the frame N arrived at the operations center 112 and the read time that the reference clock reads when the skip offset process is being performed. Thus, a difference between the read time and the receive time may indicate the latency that was introduced from the encoding process down to the frame. Based on this difference, the skip determination engine 220 may determine a corresponding skip offset that is to be used when transitioning from an end of a live content segment to a start of commercials. The skip determination engine 220 may generate the skip offset output 225 corresponding to this skip offset value that is used by the playout system 140.

The above manner of determining the skip offset is directed to an instantaneous value of a given frame or generated output included in the marked feed 125. However, the playout arrangement 155 may utilize other manners of determining the skip offset. For example, the skip offset may also be determined as an average value. When determined as an average value, the playout arrangement 155 may track a set of frames or time indications while propagating through the operations center 112. The playout arrangement 155 may determine each of the propagation delay values for these frames and determine the average which is set as the skip offset value to be used in transitioning from the live content to the commercials. The average may be taken over different criteria. For example, the average may be for all frames up to a current time. In another example, the average may be for a moving window for a set of frames or a time duration preceding a current frame or time, respectively.

Using the skip offset value corresponding to the skip offset output, the playout arrangement 155 may perform other operations in generating the playout output 160. In a first example, the playout arrangement 155 may include an engine that automatically compensates for the determined skip offset value when performing a switch from the live content to the commercials. For example, the playout arrangement 155 may calibrate the propagation delay or live event latency as the live event progresses and is broadcast. The playout arrangement 155 may perform the automatic compensation continuously, when the live event feed begins, etc. The playout arrangement 155 may also be controlled manually by a member of the staff of the operations center 112.

In compensating for the skip offset value, the playout arrangement 155 may incorporate a skip duration corresponding to the duration of the skip offset value when the live content segment ends. Thus, when a current live content segment ends (e.g., the program director has counted down to "0"), the manual intervention may be triggered (e.g., a user at the operations center 112 enters a manual input indicating that the commercials should begin airing). Upon receiving the manual intervention, the playout arrangement 155 may program a skip duration by automatically starting a timer corresponding to the propagation delay duration (e.g., 13 seconds). At the end of the propagation delay duration, the commercials may begin airing. From the perspective of the viewer (e.g., user of the end user device 170), the live content segment may be shown in the broadcast as received in the playout output 160. When the skip duration concludes, the playout arrangement 155 may then broadcast the commercials.

The playout arrangement 155 may include a safety feature. For example, as an additional safety check, a user of the operations center 112 may use a graphical user interface including a live skip button that is pressed to provide the manual input to switch from the live content to the commercials when the program director has counted down. The live skip button may display the current skip offset value that has been determined for use in the upcoming switch. The user may view the displayed skip offset value to ensure a final check that the latency value is within an acceptable range. If outside the acceptable range, the user may provide an overriding manual input to correct any subsequent operations to perform the switch. For example, to correct the subsequent operations, the user may be able to increment or decrement the offset value or manually input a new offset value. In another exemplary embodiment, a current offset value may be locked during troubleshooting such as when offset calculations experience a problem during a live event.

In generating the playout output 160, the playout arrangement 155 may include further engines or operations. For example, the playout arrangement 155 may include an advertisement broadcast operation that selects the commercials to be played out between live content segments. The playout arrangement 155 may select the commercials based on any standard. In a first example, the channel on which the television broadcast is aired may determine each commercial to be played out throughout the television broadcast in a list (e.g., timed list or priority list). Thus, the playout arrangement 155 may select the commercials for each commercial block based on the list. In a second example, in using the IP approach, a more personalized feature may be used in which the playout arrangement 155 selects commercials based on a characteristic of the end user device 170 or the end user (e.g., geographic location, demographic information, etc.). In this manner, during the television broadcast, the playout arrangement 155 may select commercials to be played out in a commercial block that is specific to the end user device 170 or end user.

The operations center 112 may include a commercial repository (not shown) from which the playout arrangement 155 may select the commercials for the television broadcast. The data for each commercial may be in a proper format consistent with the format of the playout output 160. Thus, the commercials may be previously prepared for broadcast. Accordingly, for illustrative purposes, the commercials may be assumed to not have a timing issue and are played out in an intended manner at the intended time. However, those skilled in the art will understand that there may be various issues that may arise with airing commercials and the exemplary embodiments may incorporate any mechanism that addresses these various issues (e.g., where the commercials include live content).

The playout arrangement 155 may include a further conversion operation that formats the playout output 160 in a proper broadcast format. For example, while the audiovisual and ancillary data of the live content feed 110 is transmitted around the operations center 110 (e.g., as the marked feed 125 in the SDI format and/or the compressed feed 140 as the IP transport stream), the playout output 160 may be converted. For example, any feed used as the basis for the playout output 160 may be converted to the SDI format, an ASI format, etc. Since the end user device 170 may display the broadcast in various media formats (e.g., television, web page, tablet, phone, etc.), the playout format 160 may be converted to an appropriate format so that the end user device 170 receives the broadcast.

Returning to the system 100, the playout output 160 may be provided to the end user device 170 via the communications network 165. The communications network 165 may be any type of network that enables the playout output 160 to be broadcast to the end user device 170. For example, the communications network 165 may be a cable provider network, a satellite network, a terrestrial antenna network, the public Internet, a local area network (LAN), a wide area network (WAN), a virtual LAN (VLAN), a Wi-Fi network, a cellular network, a cloud network, a wired form of these networks, a wireless form of these networks, a combined wired/wireless form of these networks, etc. The communications network 165 may include network components (not shown) that are configured to perform further functionalities in addition to providing a conduit to exchange data. Therefore, the various components of the system 100 may each represent a network component or network device.

The end user device 170 may be any type of electronic component that is configured to communicate via the communications network 165 to receive the playout output 160. For example, the end user device 170 may be a mobile phone, a tablet computer, a smartphone, a phablet, an embedded device, a wearable device, a Cat-M device, a Cat-M1 device, an MTC device, an eMTC device, another type of Internet of Things (IoT) device, a set top box, a smart television, etc. The end user device 170 may be configured with the necessary hardware, software, and/or firmware to receive the playout output 160 and display the television broadcast. For example, the end user device 170 may include a display device that displays the television broadcast to the user. The end user device 170 may be configured to receive the playout output 160 in a given format (e.g., as an IP stream, a cable television feed, an over the air broadcast, an SDI format, etc.) and perform the appropriate conversion to generate display data used in showing the broadcast to the user. The system 100 only shows a single end user device 170. However, as those skilled in the art will understand, the television broadcast through the IP approach using the playout output 160 may be broadcast such that any number of end user devices 170 may tune into the broadcast using an appropriate access feature (e.g., web browser application, etc.). Through the above process of compensating for the introduced latency using the IP approach according to the exemplary embodiments, the end user device 170 may display the television broadcast as received in the playout output 160 to the user such that the live content is switched to the commercials in a seamless manner where there is little to no dead time (e.g., when too high of a delay is incorporated) and no cut content (e.g., when too low of a delay is incorporated).

Figure 3:
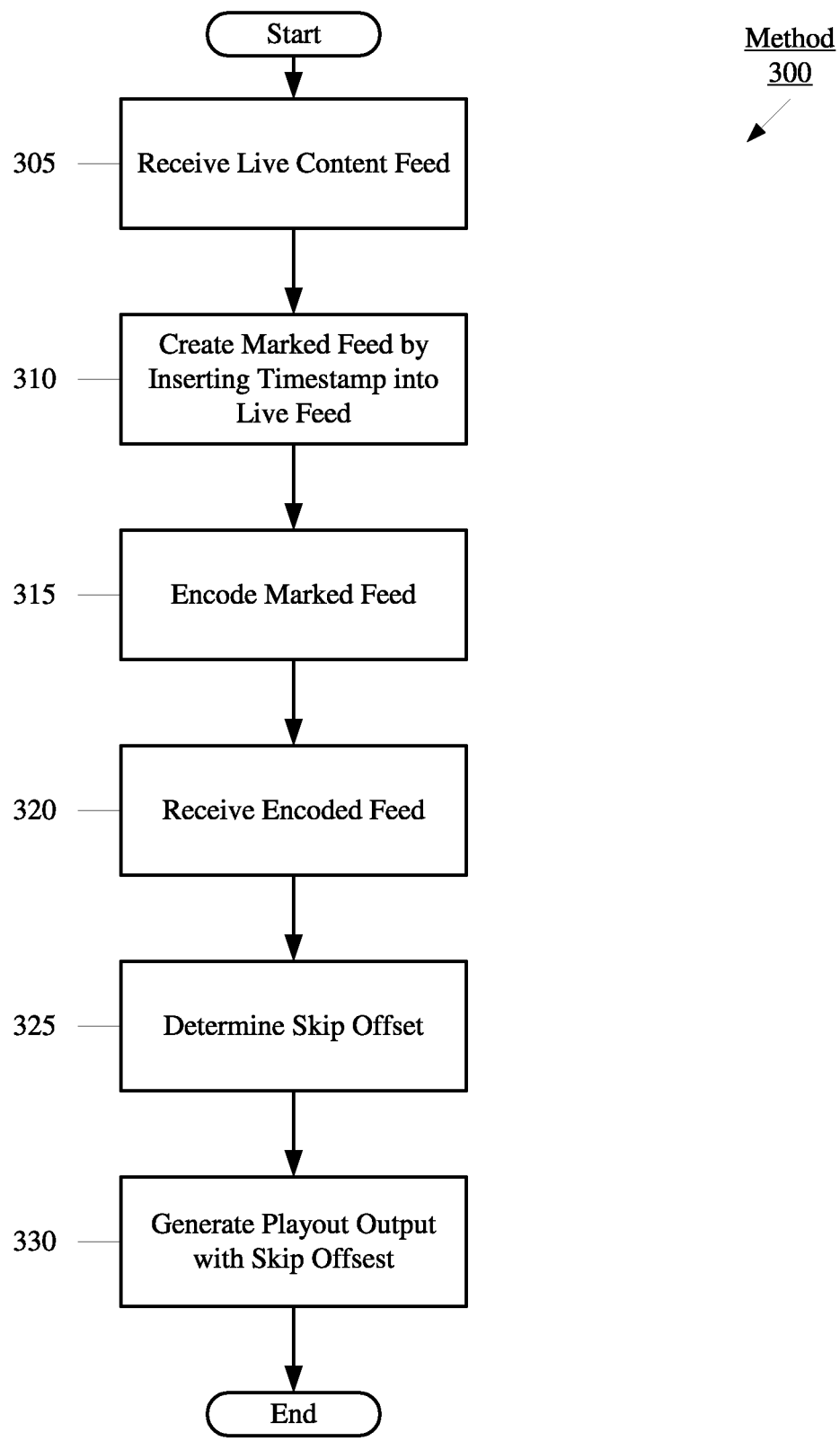
FIG. 3 shows an exemplary method to generate a playout output of a live event according to various exemplary embodiments described herein.

FIG. 3 shows an exemplary method 300 to generate the playout output 160 of a live event according to various exemplary embodiments described herein. The method 300 illustrates a manner of compensating for a propagation delay or latency introduced from the live content feed 110 propagating through the operations center 112 from encoding and other processing operations. The method 300 is described from the perspective of the operations center 112 including the playout arrangement 155. The method 300 will be described with regard to the system 100 of FIG. 1 and the playout arrangement 155 of FIG. 2.

In 305, the operations center 112 receives the live content feed 110. As described above, the live content provider 105 may generate the live content feed 110 using sensory capturing devices at a venue in which a live event is taking place. For example, the live content feed 110 may include audiovisual data and/or ancillary data. The operations center 112 may receive the live content feed 110 as an SDI feed.

In 310, the timestamp inserter 115 of the operations center 112 generates the marked feed 125 by inserting a time indication in the live content feed 110. As described above, the timestamp inserter 115 may insert the time indication (e.g., a timestamp, a timestamp, etc.) in the live content feed onto one or more frames of the live content feed 110 or in a created output inserted in the live content feed 110 using the reference clock 120. The time indication that is inserted may correspond to when the frame or created output is received at the operations center 112.

In 315, the encoder processes (or encodes) the marked feed 125. As described above, the encoder 130 may encode the marked feed 125 to generate the compressed feed 140 using IP technology. The encoder 130 may encode the marked feed 125 using any known encoding type.

In 320, the IP broadcast plant 135 of the operations center 112 receives the compressed feed 140. In 325, the playout arrangement 155 determines the skip offset value to be used when transitioning from an end of a live content segment to a start of commercials. The playout arrangement 155 may determine the propagation delay based on a receive time included in the compressed feed 140 and a corresponding read time of the reference clock 120 while the skip offset process is being performed. The playout arrangement 155 may calculate a difference between the read time and the receive time to identify the propagation delay caused from propagating the live content feed 110 through the operations center 112. The playout arrangement 155 may output the corresponding skip offset output 225 to be used when an upcoming transition from the live content to the commercials is to occur.

In 330, the playout arrangement 155 generates the playout output 160 including the live content (as received in the live content feed 110) and interspersing commercials by incorporating the skip offset value corresponding to a latency from using IP technology as the live content feed 110 is transmitted through the operations center as the compressed feed 140. The exemplary embodiments may provide an automated approach to compensating for the propagation delay. Thus, when a manual input from a manual intervention is provided to indicate a switch from the live content to the commercials, the playout arrangement 155 may set a timer for the duration of the skip offset output 225. At the expiry of the timer, the playout arrangement 155 may output the commercials in the playout output 160. By compensating for the propagation delay, the user viewing the television broadcast may see the live content, followed by a seamless transition to commercials with an acceptable amount of dead air and/or cut content.

The exemplary embodiments provide a device, system, and method of automatically determining and compensating for a latency introduced to a broadcast of live content when a feed is encoded using IP technology. By marking a live content feed for live content corresponding to the live event with a time indication, the exemplary embodiments may obtain a receive time that the live content feed is received at an operations center. When a skip offset process is performed, a read time of a common reference clock may provide another time that forms a basis to determine the latency with the receive time. The exemplary embodiments may determine a difference between the receive time and the read time which corresponds to the latency or propagation delay from processing and encoding the live content feed. The exemplary embodiments may also enable a substantially similar manual switch operation from the perspective of the user while still incorporating the skip offset difference to result in a seamless transition from the live content to the commercials (and vice versa) with no cut content, no dead airtime or any unwanted aired content.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system (e.g., Windows OS), a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:
1. A method, comprising:
 at an operations center:
  receiving a content feed of a live event;
  inserting a time indication in the content feed to generate a marked feed, the time indication indicative of a receive time at which the content feed is received at the operations center;

determining a read time during a skip offset process corresponding to a time at which the time indication is identified in the skip offset process;

determining a value for a propagation delay based on the read time and the receive time;

setting a timer to the value for the propagation delay;

upon receiving an input indicating that a transition from the live event to the recorded content is to occur, activating a timer set to the value of the propagation delay; and generating a broadcast output that transitions, upon expiration of the timer, from one of (i) the content feed to recorded content or (ii) recorded content to the content feed.

2. The method of claim 1, further comprising:

encoding the marked feed to generate an Internet Protocol (IP) feed, the IP feed being exchanged through the operations center.

3. The method of claim 1, wherein the time indication and the read time are based on a time indicated by a reference clock.

4. The method of claim 1, wherein the input is a manual input and the timer is activated upon receiving the manual input.

5. The method of claim 1, wherein the time indication is inserted into a frame of the content feed.

6. The method of claim 1, further comprising:

creating an output to be inserted into the content feed, wherein the time indication is inserted in the output.

7. The method of claim 2, wherein the IP feed is a compressed feed of the marked feed.

8. The method of claim 1, wherein the recorded content is a commercial block including at least one commercial.

9. The method of claim 1, wherein live content feed is in a serial digital interface (SDI) format.

10. The method of claim 1, wherein the broadcast output is in a serial digital interface (SDI) format.

11. An operations center, comprising:

a timestamp inserter configured to insert a time indication in a content feed of a live event to generate a marked feed, the time indication indicative of a receive time that the content feed is received at the operations center; and a playout arrangement configured to determine a read time during a skip offset process corresponding to a time at which the time indication is identified in the skip offset process, the playout arrangement configured to determine a value for a propagation delay based on the read time and the receive time, the playout arrangement configured to set a timer to the value for the propagation delay and, upon receiving an input indicating that a transition, when the timer has elapsed, from the content feed to the recorded content is to occur, transitioning a broadcast output from one of (i) the content feed to the recorded content and (ii) recorded content to the content feed.

12. The operations center of claim 11, further comprising:

an encoder configured to encode the marked feed to generate an Internet Protocol (IP) feed, the IP feed being exchanged through the operations center.

13. The operations center of claim 11, wherein the time indication and the read time are based on a time indicated by a reference clock.

14. The operations center of claim 11, wherein the input is a manual input and the timer is activated upon receiving the manual input.

15. The operations center of claim 11, wherein the time indication is inserted into a frame of the content feed.

16. The operations center of claim 11, wherein the timestamp inserter is further configured to create an output to be inserted into the content feed, wherein the time indication is inserted in the output.

17. The operations center of claim 12, wherein the IP feed is a compressed feed of the marked feed.

18. The operations center of claim 11, wherein the recorded content is a commercial block including at least one commercial.

19. The operations center of claim 11, wherein the content feed is in a serial digital interface (SDI) format.

20. The operations center of claim 11, wherein the broadcast output is in in a serial digital interface (SDI) format.

* * * * *